(12) United States Patent
van der Meer

(10) Patent No.: US 7,345,584 B2
(45) Date of Patent: Mar. 18, 2008

(54) PORTABLE DEVICE AND METHOD FOR USE THEREON AND METHOD FOR USE THEREOF

(75) Inventor: Wiebe Hilles van der Meer, Rhenen (NL)

(73) Assignee: Wiebe van der Meer Holding B.V., ES Bunnik (NL)

( * ) Notice: Subject to any disclaimer, the term of this patent is extended or adjusted under 35 U.S.C. 154(b) by 43 days.

(21) Appl. No.: 11/061,852

(22) Filed: Feb. 17, 2005

(65) Prior Publication Data

US 2005/0264419 A1    Dec. 1, 2005

(51) Int. Cl.
*G08B 13/14*    (2006.01)
(52) U.S. Cl. .................. 340/572.1; 340/5.2; 340/5.53; 340/572.5; 340/573.1
(58) Field of Classification Search ............. 340/572.1, 340/572.2, 572.4, 572.7, 567, 568.1, 573.4, 340/573.1, 572.5, 5.2, 5.53, 5.82
See application file for complete search history.

(56) References Cited

U.S. PATENT DOCUMENTS

| | | | | |
|---|---|---|---|---|
| 4,070,649 A | * | 1/1978 | Wright et al. ................ | 382/188 |
| 5,528,002 A | * | 6/1996 | Katabami ................ | 178/19.06 |
| 5,892,824 A | * | 4/1999 | Beatson et al. ............. | 713/186 |
| 6,714,133 B2 | * | 3/2004 | Hum et al. ............... | 340/573.4 |
| 6,891,474 B1 | * | 5/2005 | Fletcher .................... | 340/572.1 |
| 6,974,917 B2 | * | 12/2005 | Hattori et al. ........... | 178/18.01 |

\* cited by examiner

*Primary Examiner*—Davetta W. Goins
(74) *Attorney, Agent, or Firm*—Black Lowe & Graham PLLC

(57) ABSTRACT

The present invention provides a portable device, comprising first identification means for wireless transmission and/or reception of electromagnetic radiation for the purpose of identification thereof, in addition to a system, comprising: a transmitter for wireless transmission of electromagnetic radiation with at least a first frequency, a portable device and a receiving circuit for wireless reception of electromagnetic radiation, wherein a change occurs in the electromagnetic radiation received by the receiving circuit when the device is located in the vicinity of the receiving device.

32 Claims, 3 Drawing Sheets

PORTABLE DEVICE AND METHOD FOR USE THEREON AND METHOD FOR USE THEREOF

PRIORITY CLAIM

This application claims priority to The Netherlands application serial number 1026275, filed on May 26, 2004.

The present invention relates to a portable device and a method for the use thereof. A portable device in the broadest sense of the word is generally known and comprises for instance a pen, such as a ballpoint or fountain pen, a pencil, refillable pencil, felt-tip pen or fineliner, an electric pointing device such as a laser pointer, pen-light, stylus or probe. Other personal objects could also fall into this category such as a whistle used to raise an alarm or a dog whistle, a dispenser for instance for medication, glue and perfume, or a combination of the foregoing devices.

The pen for instance comprises a barrel in which an ink container is arranged. The ink container is connected to a tip arranged on an outer end of the barrel. When the tip comes into contact with a surface, ink arranged in the ink container flows via the tip onto the Surface. Such a known writing device can thus be used for instance to write or draw with.

The application of the known device is however relatively limited.

The present invention therefore has for its object to extend the possibilities of the known device.

The invention relates to a portable device, comprising first identification means for a wireless transmission and/or reception of electromagnetic radiation.

The possibilities and applications of a portable, personal device according to the present invention are however more comprehensive. Applicant for instance supplies writing devices which are provided with an advertising text which are used as promotional gift. By using devices according to the invention, these promotional gifts can also be used as means of identification. This is useful at fairs where devices such as pens are handed out upon entrance to the fair and are subsequently used during the fair as admission pass.

In a preferred embodiment the device is a writing device comprising: an elongate holder, an ink reservoir arranged in the holder and at least partially filled with ink, an ink-dispensing member which is arranged through an opening of the holder and which is connected to the ink reservoir in order to apply ink to ace therewith.

In this embodiment the writing device can be used as a pen and is therefore suitable for all manner of writing applications.

Further preferred embodiments are described in claims 2 to 14.

The invention further relates to a system, comprising:
a transmitter for wireless transmission of electromagnetic radiation with at least a first frequency;
a portable device;
a receiving circuit for wireless reception of electromagnetic radiation;
wherein a change occurs in the electromagnetic radiation received by the receiving circuit when the portable device is located in the vicinity of the receiving device.

Such a system provides all the advantages of the above stated novel portable device and can be directly used at fairs, in shops and companies for the identification of a user and for admission checks. But also for the purpose of identification of the writing articles themselves in their department stores and shops, in their closed packages, boxes, outer boxes and pallets.

The present invention moreover provides a method for use of a device or of a system as stated above.

Further advantages and features are elucidated with reference to the annexed figures, in which.

Figure 1:
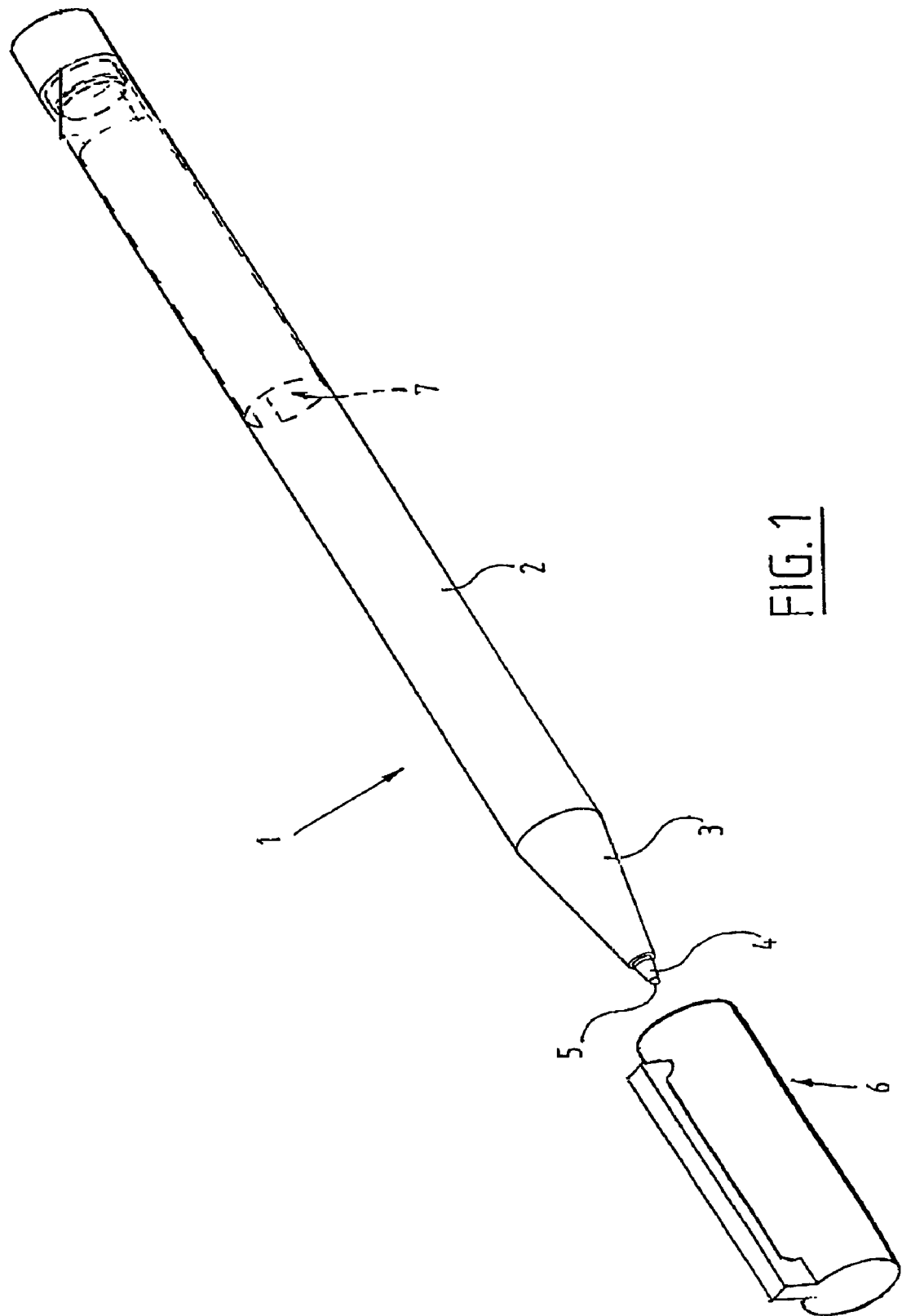
FIG. 1 shows a perspective view of a writing device according to the present invention in a first preferred embodiment.

A portable device is interpreted according to the present invention in the broadest sense of the word, and can comprise all the devices mentioned in the second paragraph of page 1.

As a preferred embodiment the invention will be elucidated on the basis of a pen 1 formed by a holder 2 in which there is arranged an ink reservoir (not shown) at least partially filled with ink. The holder is provided with a conical outer end 3 which ends in an opening through which protrudes an ink-dispensing member 4 of the ink reservoir.

The ink-dispensing member 4 comprises a conically tapering tip in which a ball 5 is arranged. When ball 5 comes into contact with a surface, such as paper or, depending on the ink used plastic or any other desired surface, this ball rotates whereby ink is moved from the side of the ink reservoir to the surface. The pen can thus be used to write, draw and the like. In order to protect the tip of the ink reservoir against dirt and drying-out, a cylindrical cap 6 can optionally be placed removably there over.

Figure 2:
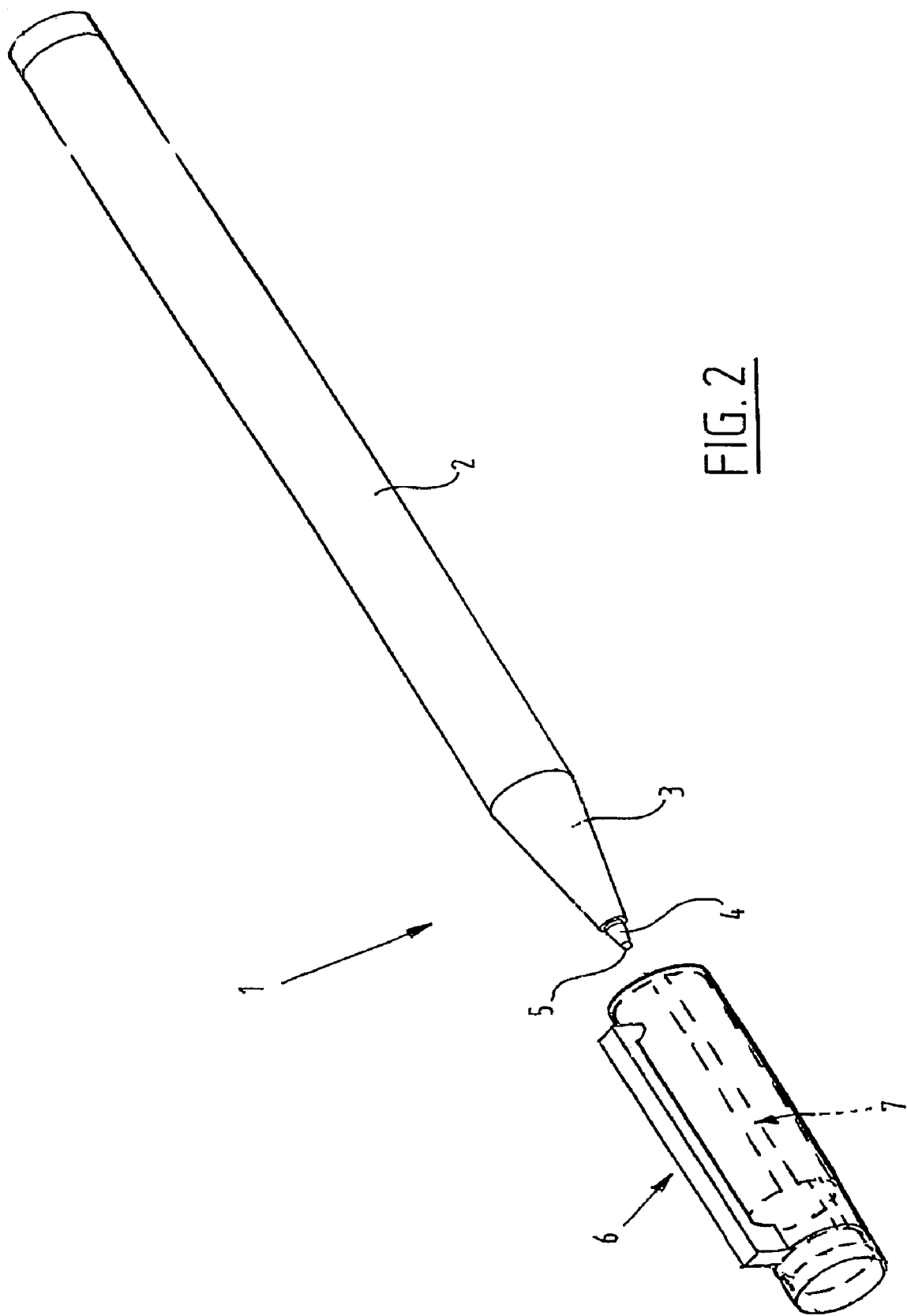
FIG. 2 shows a perspective view of a writing device according to the present invention in a second embodiment.

In order to increase the possible applications of the writing device, there are arranged first identification means 7 comprising a so-called RFID. These first identification means can be arranged in or on holder 2 (FIG. 1), and it is also possible to arrange the RFID in or on cap 6 (FIG. 2).

For further increasing the functionality of the first identification means, comprising RFID technology, it is desirable that the radio frequency data is transmitted over distances of an order of magnitude of one metre or more. For this purpose, two possibilities are introduced in the present invention.

The first possibility is to apply a second antenna being externally connected to the first identification means in order to amplify the antenna functionality of the RFID-tag.

The second possibility is to temporarily alter the functionality from a passive RFID-tag into an active RFID-tag, therefore enhancing the detection range from several centimetres up to distances of over 10 metres. A passive RFID-tag is powered up by the low-frequency wave field emitted by the RFID reader, whereas an active RFID-tag is normally provided with a power source to enable active transmission. The present invention introduces, in addition to the common used batteries, alternative power sources, such as a capacitor, a piezoelectric device, an induction device and a flywheel. The latter three technologies are capable of generating power by mechanical activity, such as pressing together parts of the writing device by the user and lightly shaking.

Information provided by the RFID-tag is, as described above, used for identification. However, similar as with standard keys for mechanical locks, any person other than the rightful owner would also be capable of using the first identification means for getting access, and also for other functionalities provided by the present invention, such as payment, etc. Therefore, additional identification means are introduced in the present invention.

The first possibility for identifying the rightful owner is to apply second identification means, comprising fingerprint recognition, in the writing device.

The second possibility for identifying the rightful owner is to apply third identification means, comprising a personal identification code that can be input mechanically, e.g. by revolving two parts of the writing device relative to each other.

The third possibility for identifying the rightful owner is to apply fourth identification means, comprising a movement sensor, e.g. a gyroscope, to verify the written signature with the rightful's owner signature stored in the memory of the writing device.

In a further preferred embodiment (not shown), it is possible to arrange the RFID in a holder which can be arranged around barrel 2, for instance by gluing or clamping. This is advantageous since the holder can be arranged on pens which have already been manufactured and are still held in stock, for instance for advertising purposes.

The writing device is preferably provided with a clip or clamp with which it can be attached to other objects, for instance to a belt or in a breast pocket. Such a clip can also serve for fastening of a chain with which the device can be carried around the neck. The clip or clamp is suitable for arranging of the RFID thereon.

Figure 3:
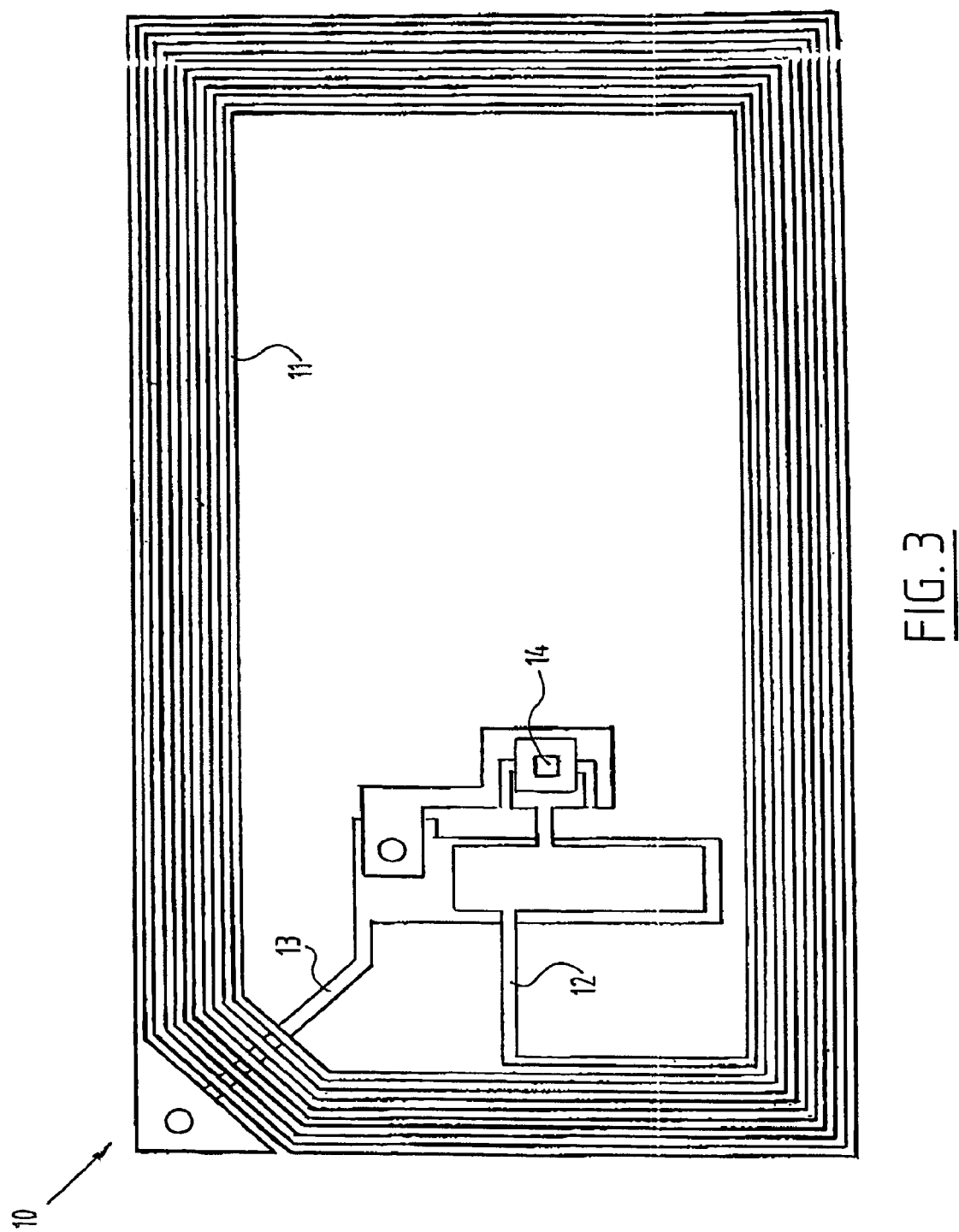
FIG. 3 shows a top view of resonance means in a first preferred embodiment.

The first identification means preferably comprise a resonance circuit 10 having one or more resonance frequencies (FIG. 3). In the shown preferred embodiment, the resonance circuit comprises a plurality of windings 11 of a material which conducts electricity and thus form an antenna. Windings 11 are connected at the outer ends 12, 13 via a semiconductor element or memory chip 14. The properties of resonance circuit 10 can be extended through use of the semiconductor element 14. It is thus possible for the resonance circuit, when receiving a first resonance frequency, to transmit a different second frequency. This second frequency can be an integer multiple of the first frequency, for instance twice the first frequency.

When the writing device provided with the resonance means is placed between a transmitter of electromagnetic radiation and a receiving circuit arranged close to the transmitter, the resonance means absorb the energy of a possibly transmitted resonance frequency. The receiving circuit detects from the changed frequency spectrum received that an element has been arranged between the transmitter and the receiving circuit. The change caused by the pen with resonance means is specific to this one pen, so that such a pen can be used as identification.

The RFID is preferably connected to a battery (not further shown), whereby it is able to transmit one or mere resonance frequencies for an active identification. In this case the first identification means also comprise the transmitter, so that only a receiver need be arranged externally which discerns when the writing device is within a predefined distance of the receiver. The distance is determined by the range of the electromagnetic radiation transmitted wirelessly by the transmitter.

In order to elucidate the foregoing, a distinction is therefore made between passive and active RFID, wherein the latter is provided with a battery to enable active transmission. The active and passive embodiment can be provided with a switch for the purpose of switching the RFID on or off.

The RFID is for instance supplied by the firm of Control Electric Company Inc. (http://www.controlelectric.com), providing RFID-tags for use in the frequency range from 30 kHz to 3 Ghz.

The present invention is not limited to the above described preferred embodiments, in which many modifications are possible within the context of the appended claims. The applications are almost unlimited and more extensive than advertising alone.

The invention claimed is:

1. A portable device, comprising:
an elongate holder;
an ink reservoir arranged in the holder and configured to contain a quantity of ink;
an ink-dispensing member configured to apply ink received from the ink reservoir onto a surface brought in contact with the ink-dispensing member;
first identification means for wireless transmission of electromagnetic radiation for the purpose of identification of the device; and
a cap being attached to an end of said ink-dispensing member; and said identification means being attached in said cap
a cap for arranging over an opening the holder defines, on which cap the first identification means are arranged.

2. The device as claimed in claim 1, wherein the first identification means include a power source.

3. The device as claimed in claim 2, wherein the identification means transmits at least a first resonance frequency.

4. The device as claimed in claim 2, wherein the power source includes a battery.

5. The device as claimed in claim 2, wherein the power source includes a capacitor.

6. The device as claimed in claim 2, wherein the power source includes a piezoelectric device.

7. The device as claimed in claim 2, wherein the power source includes an induction device.

8. The device as claimed in claim 2, wherein the power source includes a flywheel.

9. The device as claimed in claim 1, further comprising an antenna connected to the first identification means.

10. The device as claimed in claim 1, further comprising a second identification means comprising fingerprint recognition configured to compare a finger print of a user to a stored fingerprint exemplar.

11. The device as claimed in claim 1, further comprising a third identification means for verifying rightful possession by identification, said third identification means comprising mechanical means for entry of a personal identification code for comparison to a stored code.

12. The device as claimed in claim 1, further comprising a fourth identification means comprising at least one gyroscope configured to compare acceleration of the holder during signature to compare with stored movements corresponding to a written signature.

13. The device as claimed in claim 1 further comprising a clip for fastening thereof to other objects.

14. The device as claimed in claim 1, further comprising a laser pointer.

15. A system comprising:
writing means within a holder; and
a cap for arranging over an opening the holder defines including:
a transmitter for wireless transmission of electromagnetic radiation within an effective transmission range, the wireless transmission being modulated with at least a first frequency; and
a receiving circuit for wireless reception of electromagnetic radiation, wherein a change occurs in the electromagnetic radiation received by the receiving circuit when the receiving circuit is located within the effective transmission range of the transmitter, the transmitter transmitting the wireless transmission including a first identification means in response to the change.

16. The system according to claim 15, wherein the writing means includes:
an ink reservoir arranged in the holder and configured to contain a quantity of ink; and
an ink dispensing member configured to apply ink received from the ink reservoir onto a surface brought in contact with the ink dispensing member.

17. A portable device, comprising:
an elongate holder;
an ink reservoir arranged in the holder and configured to contain a quantity of ink;
an ink-dispensing member configured to apply ink received from the ink reservoir onto a surface brought in contact with the ink-dispensing member;
a first identification means for wireless transmission of electromagnetic radiation for the purpose of identification of the device; and
a second identification means comprising fingerprint recognition configured to compare a finger print of a user to a stored fingerprint exemplar.

18. The device as claimed in claim 17, wherein the first identification means include a power source.

19. The device as claimed in claim 17, wherein the identification means transmits at least a first resonance frequency.

20. The device as claimed in claim 17, further comprising an antenna connected to the first identification means.

21. A portable device, comprising:
an elongate holder;
an ink reservoir arranged in the holder and configured to contain a quantity of ink;
an ink-dispensing member configured to apply ink received from the ink reservoir onto a surface brought in contact with the ink-dispensing member;
a first identification means for wireless transmission of electromagnetic radiation for the purpose of identification of the device; and
a second identification means comprising identification means for verifying rightful possession by identification comprising mechanical means for entry of a personal identification code for comparison to a stored code.

22. The device as claimed in claim 21, wherein the identification means transmits at least a first resonance frequency.

23. The device as claimed in claim 21, further comprising an antenna connected to the first identification means.

24. A portable device, comprising:
an elongate holder;
an ink reservoir arranged in the holder and configured to contain a quantity of ink;
an ink-dispensing member configured to apply ink received from the ink reservoir onto a surface brought in contact with the ink-dispensing member;
a first identification means for wireless transmission of electromagnetic radiation for the purpose of identification of the device; and
a second identification means comprising identification means comprising at least one gyroscope configured to compare acceleration of the holder during signature to compare with stored movements corresponding to a written signature.

25. The device as claimed in claim 24, wherein the identification means transmits at least a first resonance frequency.

26. The device as claimed in claim 24, further comprising an antenna connected to the first identification means.

27. A system comprising:
writing means; and
a transmitter connected to the writing means, the transmitter for wireless transmission of electromagnetic radiation within an effective transmission range, the wireless transmission being modulated with at least a first frequency;
a receiving circuit for wireless reception of electromagnetic radiation, wherein a change occurs in the electromagnetic radiation received by the receiving circuit when the receiving circuit is located within the effective transmission range of the transmitter, the transmitter transmitting the wireless transmission including a first identification means in response to the change; and
a second identification means comprising fingerprint recognition configured to compare a finger print of a user to a stored fingerprint exemplar.

28. The system according to claim 27, wherein the writing means includes: an ink reservoir arranged in the holder and configured to contain a quantity of ink; and an ink-dispensing member configured to apply ink received from the ink reservoir onto a surface brought in contact with the ink-dispensing member.

29. A system comprising:
writing means; and
a transmitter connected to the writing means, the transmitter for wireless transmission of electromagnetic radiation within an effective transmission range, the wireless transmission being modulated with at least a first frequency;
a receiving circuit for wireless reception of electromagnetic radiation, wherein a change occurs in the electromagnetic radiation received by the receiving circuit when the receiving circuit is located within the effective transmission range of the transmitter, the transmitter transmitting the wireless transmission including a first identification means in response to the change; and
a second identification means for verifying rightful possession by identification comprising mechanical means for entry of a personal identification code for comparison to a stored code.

30. The system according to claim 29, wherein the writing means includes:
an ink reservoir arranged in the holder and configured to contain a quantity of ink; and
an ink-dispensing member configured to apply ink received from the ink reservoir onto a surface brought in contact with the ink-dispensing member.

31. A system comprising:
writing means; and
a transmitter connected to the writing means, the transmitter for wireless transmission of electromagnetic radiation within an effective transmission range, the wireless transmission being modulated with at least a first frequency;
a receiving circuit for wireless reception of electromagnetic radiation, wherein a change occurs in the electromagnetic radiation received by the receiving circuit when the receiving circuit is located within the effective transmission range of the transmitter, the transmitter transmitting the wireless transmission including a first identification means in response to the change; and a second identification means for verifying rightful possession by identification comprising at least one gyroscope configured to compare acceleration of the holder during signature to compare with stored movements corresponding to a written signature.

32. The system according to claim 31, wherein the writing means includes:
   an ink reservoir arranged in the holder and configured to contain a quantity of ink; and
   an ink-dispensing member configured to apply ink received from the ink reservoir onto a surface brought in contact with the ink-dispensing member.

* * * * *